United States Patent [19]
Lauer

[11] 3,767,552
[45] Oct. 23, 1973

[54] GAS ANALYZER

[75] Inventor: Jay M. Lauer, Hacienda Heights, Calif.

[73] Assignee: Teledyne Industries, Inc., Los Angeles, Calif.

[22] Filed: Oct. 6, 1971

[21] Appl. No.: 187,051

[52] U.S. Cl. ............................................. 204/195 P
[51] Int. Cl. ............................................. G01n 27/46
[58] Field of Search .......................... 204/1 T, 195 P

[56] References Cited
UNITED STATES PATENTS

| | | | |
|---|---|---|---|
| 3,227,643 | 1/1966 | Okun et al. | 204/195 P |
| 3,235,477 | 2/1966 | Keyser et al. | 204/195 P |
| 3,239,444 | 3/1966 | Heldenbrand | 204/195 P |
| 3,260,656 | 7/1966 | Ross | 204/1 T |
| 3,322,662 | 5/1967 | Mackereth | 204/195 P |
| 3,429,796 | 2/1969 | Lauer | 204/195 P |
| 3,503,861 | 3/1970 | Volpe | 204/195 P |
| 3,577,332 | 5/1971 | Porter et al. | 204/195 P |
| 3,616,410 | 10/1971 | Shtoffer et al. | 204/195 P |

*Primary Examiner*—T. Tung
*Attorney*—Marvin E. Jacobs et al.

[57] ABSTRACT

An electrochemical gas analyzer is disclosed. The analyzer comprises an insulator body having a central passage divided into an electrochemical cell chamber and a gas expansion chamber by a first flexible, liquid impermeable expansion membrane. An anode in the form of a high surface area, liquid-pervious body of a nonpolarizable metal is received in the cell chamber. The upper surface of the cell chamber is enclosed by a thin, perforated, convex cathode of a polarizable metal that is non-flexible under the conditions of operation of the analyzer. The cathode is covered with a gas-permeable, electrolyte-impermeable membrane which conforms to the surface of the cathode and exhibits less tendency to flex than the first flexible membrane. Sufficient liquid electrolyte is present between the membranes to fill the entire cell chamber.

14 Claims, 3 Drawing Figures

PATENTED OCT 23 1973 3,767,552
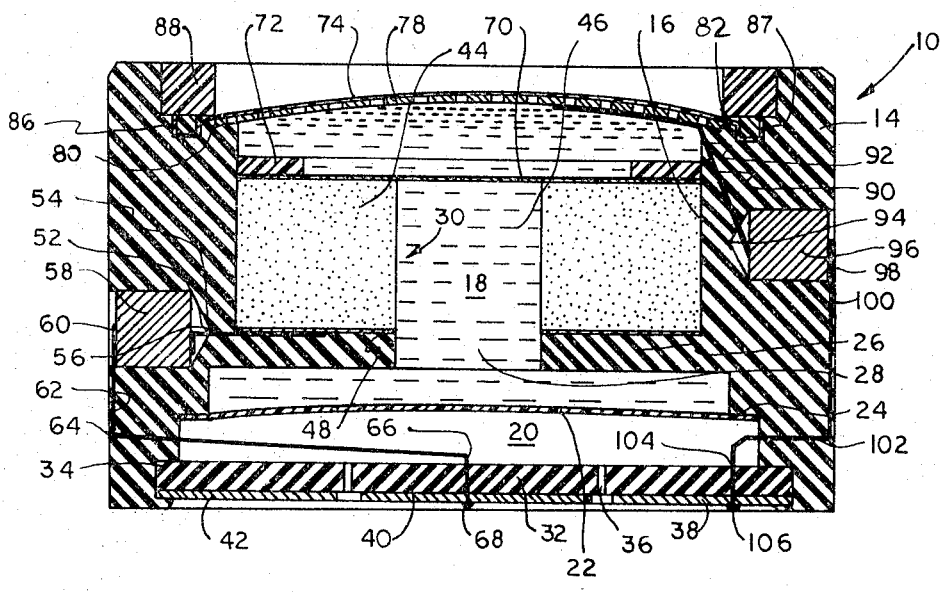
FIG 1
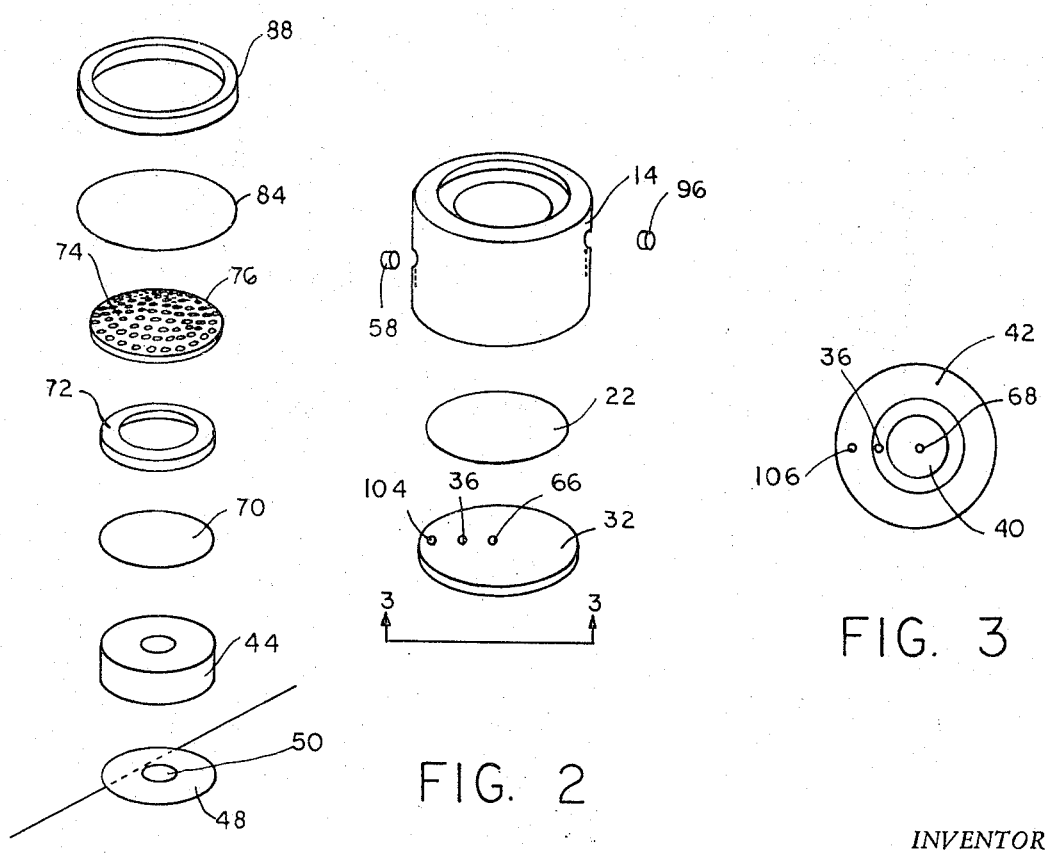
FIG. 2
FIG. 3
INVENTOR.
JAY M. LAUER

GAS ANALYZER

BACKGROUND OF THE INVENTION

1. Field of the Invention

The present invention relates to gas analyzers and, more particularly, to an improved electrochemical gas analyzer.

2. Description of the Prior Art

Various types of electrolytic oxygen sensing devices are available for use in measuring the oxygen content of gaseous mixtures as well as the dissolved oxygen content of fluids. Typically, these devices utilize an electrolytic cell employing a pair of spaced electrodes immersed in electrolyte and an electrical parameter relating to oxidation or reduction is measured and related to concentration of oxygen. Polarographic devices measure a characteristic reduction potential and a diffusion current proportional to concentration. Usually the cell is isolated from the liquid being measured by a membrane impermeable to liquids, but selectively permeable to gas.

In U.S. Pat. No. 3,429,796, an electrochemical gas analyzer is disclosed in which linearity of response is improved by use of a flat, planar mesh cathode covered with a plastic membrane. This provides a uniform electrolyte film between the cathode and the membrane necessary for accurate response over a large range. However, it has been discovered that it is very difficult to form and maintain the cathode in a uniformly planar condition with respect to the adjacent stretched membrane.

The areas of non-uniform electrolyte film thickness which develop in unavoidably distorted areas of the cathode affect the stability of the instrument and its overall response characteristics.

Furthermore, the analyzer is frequently subjected to environments in which large pressures develop within the cell which cause separation of the membrane from the cathode or may even cause permanent distortion of the membrane of cathode. For example, a quick change in temperature of the environment may cause a pressure surge within the cell compartment. When the instrument is used in a hyperbaric environment, the pressure may suddenly change from superatmospheric pressure to atmospheric pressure. The change in environment from a less permeable gas such as nitrogen to a more permeable gas such as hydrogen could also create internal expansion within the cell compartment.

OBJECTS AND SUMMARY OF THE INVENTION

Therefore an object of this invention is to provide a compact and convenient electro-chemical cell module for a gas analyzer.

Another object of this invention is the provision of an electrochemical gas analyzer cell that is more insensitive to temperature and pressure fluctuations as well as changes in background gas compositions.

A further object of the present invention is to improve the reliability of operation and response of an electrochemical sensor for determining the oxygen content of gas mixtures or the dissolved oxygen content of liquids.

These and many other attendant advantages and objectives of the invention will become apparent as the description proceeds.

The gas analyzer cell in accordance with the invention generally includes an insulator body having a central passage divided into a first cell chamber and a second expansion chamber by a first, flexible, expansion membrane. The cell chamber contains an anodic mass of a nonpolarizable metal and is enclosed by a uniformly curved, cathodic member of polarizable metal covered by a second membrane which is impervious to liquid, but pervious to gas. The electrolyte fills the entire cell chamber from the bottom surface of the cathode membrane to the upper surface of the expansion membrane. The expansion chamber is enclosed by a vented base plate to form an expansion chamber and contact means are provided on the bottom surface of the base plate and are connected by means of conductors extending through the body and around the expansion membrane into contact with the anode and the cathode.

The slightly, upwardly protruding, uniformly curved cathode provides intimate and continuous contact with the stretched, gas-permeable cathode membrane. This condition provides a very uniform film of electrolyte between the lower surface of the membrane and the upper surface of the cathode which is responsible for the highly uniform and linear response of the cell. This condition is maintained in diverse environments and quick changes of the temperature or pressure of an environment due to the fact that internal volume changes caused by temperature or pressure changes of the environment are accommodated by the preferential flexing of the expansion membrane and release of pressure through the vent hole in the base plate.

The invention will now become better understood by reference to the following detailed description when considered in conjunction with the accompanying drawings.

BRIEF DESCRIPTION OF THE DRAWINGS

FIG. 1 is a sectional view of the gas analyzer in accordance with the invention;

FIG. 2 is a perspective detailed view of the assembly forming the analyzer of the invention; and FIG. 3 is a view taken along the line 3—3 of FIG. 2.

DESCRIPTION OF THE PREFERRED EMBODIMENTS

Referring now to FIGS. 1–3, the analyzer cell 10 is housed in an insulator body adapted to be inserted into the end of a holder, not shown. The body 14 of the cell is formed of an insulating material, suitably a thermoplastic hydrocarbon resin such as polyethylene since this facilitates the formation of heat seals with various portions of the device. The holder is provided with mating contacts and may house the power supply and meter for the analyzer. The cell 10 is a sealed unit adapted to be utilized until the available anodic metal is converted to an oxidized form. The cell is then discarded and replaced with a new cell.

The body 14 of the cell is suitably in a cylindrical form or other shape adapted for insertion into the holder. An axial passage 16 extends through the body 14. The passage 16 is divided into an upper electrolyte cell chanber 18 and a lower expansion chamber 20 by means of a flexible, expansion membrane 22 sealingly attached to the shoulder 24. The membrane may be sealed by adhesive or by heat sealing techniques. A flange 26 having a central aperture 28 is provided above the shoulder 22 for supporting the anode 30.

The expansion chamber 20 is enclosed by an end plate 32 attached to the shoulder 34 by adhesive or heat sealing. The end plate has a vent hole 36 and is suitably formed of a rigid insulating material such as glass reinforced epoxy. The bottom surface 38 is provided with an anode contact foil area 40 and a cathode contact foil area 42 as shown in FIG. 3.

The anode 30 is formed of a porous, high available surface area body 44 of a non-polarizable metal non-reactive with the electrolyte such as lead, cadmium or antimony. The anode is preferably formed of lead in particulate form which is intended to cover particles or filamentary material such as metal gauze or metal wool. In a preferred embodiment, the body contains a central aperture 46 for rapid transmission of pressure waves or surges to the expansion membrane 22.

The particulate lead is preferably formed into a cohesive mass and is preliminarily treated to remove any oxide coating on the surfaces of the particles. By way of illustration, lead granules having an average size between 5 to 10 mils are placed in a forming tool and are treated with a 10 percent solution of potassium hydroxide. By this means, the oxide coating is removed and the particles sinter into a cohesive mass.

An anode contact plate 48 having a central aperture 50 is provided to assure good electrical contact with the porous anode body 44. The plate 48 may be formed of a conductive metal having good corrosion resistance to the electrolyte under the conditions of operating the cell or it may be formed of the same material as the anode.

A contact wire 52 is welded to the plate 48, The wire 52 is threaded through a small diameter aperture 54 into a machined bore 56 extending into the side of the body 14. The wire is welded to a conductive plug 58, suitably formed of stainless steel received in the bore 56. A further length of wire 60 is welded to the exterior of the plug 58. The wire 60 may be recessed in a groove 62 formed in the side of the body 14 and is reinserted into the body through an aperture 64 below the expansion membrane 22 and through an aperture 66 in the end plate 32. The end of the wire is connected to a terminal 68 in the center of the anode contact foil 40.

The top surface of the anode body 44 may be enclosed by a disc 70 of a material permeable to liquid but impermeable to solids to prevent particles that break away from the anode body 44 from floating within the electrolyte into contact with the cathode and shorting the cell 10. The disc is suitably formed of filter paper and is retained in place by a plastic washer 72 which presses the edge of the disc 70 onto the top surface of the anode.

The cell chamber 18 is enclosed by a convex, perforated cathode 74. The outer edge 76 of the cathode 74 is received in a first groove 80 on the upper shoulder 82. A gas-permeable, liquid-impermeable membrane 84 is stretched over the cathode and the outer edge is heat sealed in a second groove 86 provided in the shoulder 84. The groove 86 is filled with a sealant 87 and is enclosed by a dress ring 88.

A connecting wire 90 is welded to the cathode 74 and is threaded through a hole 92 into a second bore 94 provided in the side of the cell body 14. The wire 90 is welded to a conductive sealing plug 96 received in the bore. A further wire 98 is welded to the outside surface of the plug and extends down a groove 100 into the body through an aperture 102 in the body below the expansion membrane 22, through an aperture 104 in the base plate 32 into contact with the terminal 106 in the center of the cathode contact foil 42.

Since smoothness and uniformity of the outer cathode surface provides more uniform and intimate contact with the cathode membrane, it is preferred to utilize a planar, multi-apertured metal material. The planar, multi-apertured metal material may be formed from electroformed or electroetched metals or from perforated metal sheet or metal film.

The cathode surface is formed of a polarizable metal, suitably a noble metal such as gold, silver or platinum. The cathode may be formed of an inner core which is plated or coated with the noble metal. The core is preferably a resistance weldable material so as to facilitate connection to the contact wires. By way of exemplification, the cathode can be formed from gold plated brass.

The cathode is preferably capable of assuming and maintaining a convex shape such that the cathode does not bend, wrinkle or distort under conditions of usage. Suitably, the gold plated, brass cathode has a thickness of 10–25 mils to provide the desired inflexibility for the intended service.

The malleable cathode is formed into the desired convex shape with appropriately shaped forming tools. The curvature of the cathode is sufficient to tension the membrane to assure firm contact with the cathode but does not stretch the membrane beyond its elastic limit.

The cathode membrane is then stretched over the cathode and sealed in place. The cathode membrane seals the electrolyte within the cell while permitting passage of gas into the cell. The membrane is preferably a synthetic organic resin inert to the electrolyte and is suitably a vinyl resin such as polyethylene, polypropylene or polytetrafluoroethylene.

The expansion membrane is formed of a flexible synthetic resin and is provided in a thickness and of a material such that it is more flexible than the cathode membrane. The expansion membrane is also inert to the electrolyte. By way of exemplification, the cathode membrane is suitably formed of polytetrafluoroethylene in thickness from 0.125 to 2.0 mils, and the expansion membrane is formed of polyethylene film having a thickness from 1–4 mils, suitably a laminated polyethylene having a thickness from 2–3 mils. The expansion membrane is preferably prestretched before installation and when installed will exhibit a slight sag.

The electrolyte may be basic, neutral or acid but is preferably an aqueous solution of any one or mixture of the following: potassium hydroxide, potassium carbonate or potassium phosphate, for example a 10 percent solution of potassium hydroxide.

The cell is fabricated by machining the various grooves, shoulders and recesses within the body. The parts of the device are assembled as illustrated in FIG. 2 and as explained above. The cell is inserted into the holder which connects the electrodes through an external circuit and during measurement, the outer surface of the cathode membrane is immersed in the sample being tested. The membrane permits the permeation of oxygen into the cell chamber at a rate which is proportional to the concentration of oxygen on each side of the membrane. Since the concentration inside the cell is negligible when the cell is in dynamic equilibrium, the rate of influx of oxygen is proportional to the concentration of oxygen in the sample being tested. The oxygen reaching the cathode is reduced to form hydroxyl ions. Simultaneously, the anodically liberated lead ions form insoluble lead dioxide. A current corresponding to the rate of the above reactions flows in the external circuit and causes a corresponding indication on an ammeter or recorder.

Aside from normal industrial, medical and gas phase applications, the cell may be utilized to provide highly accurate monitoring of the oxygen content of fluids such as in the monitoring of boiler feed water, process streams, plant or municipal effluent, or surface waters to determine biological or chemical oxygen demand. The cell of this invention is particularly capable of reliable operation in environments which may cause changes of the internal volume within the cell.

It is to be understood that only preferred embodiments of the invention have been described and that numerous substitutions, alterations and modifications are all permissible without departing from the spirit and scope of the invention as defined in the following claims.

What is claimed is:

1. An electrochemical cell for the monitoring of a gas comprising:
   insulator walls defining a container having a central passageway;
   a liquid-impermeable, expansion membrane supported on said walls across one end of said entire central passageway dividing said passageway into a cell chamber and an expansion chamber;
   an anode comprising a porous, high surface area body of a nonpolarizable metal disposed in said cell chamber, said body having a central bore extending therethrough;
   a cathode comprising a multi-apertured sheet of a polarizable metal;
   means supporting said sheet across said central passageway to enclose the other end of said cell chamber;
   a second membrane formed of a liquid-impermeable, gas-permeable material sealingly attached to said walls and in intimate tensioned contact with the upper surface of the cathode, said second membrane being less flexible than said expansion membrane;
   a body of electrolyte between said membranes and in said central bore immersing said anode, and in a quantity sufficient to wet all surfaces of the cathode; and
   contact means affording electrical connection to each of said electrodes.

2. A cell according to claim 1 further including an insulator base plate having a gas vent hole enclosing said expansion chamber and electrode contact terminal means supported on the outside surface of the base plate.

3. A cell according to claim 2 in which said contact means includes a conductor connected to each of said electrodes, said conductor sealingly penetrating the wall of said cell chamber, the wall of said expansion chamber and the base plate into contact with said terminal.

4. A cell according to claim 1 further including a bore extending into the side wall of the container and extending into said cell chamber, a conductive metal plug inert to the electrolyte sealingly received in the bore, said plug forming a portion of said contact means.

5. A cell according to claim 1 further including an annular flange extending into said passageway above said expansion membrane for supporting the anode.

6. A cell according to claim 5 further including an annular metal contact plate disposed between said flange and said anode.

7. A cell according to claim 5 further including an electrolyte permeable disc and means for supporting the disc over the top surface of the body of the anode.

8. A cell according to claim 5 in which the anode is formed of a sintered body of particulate non-polarizable metal non-reactive with the electrolyte.

9. A cell according to claim 8 in which th membranes are formed of synthetic organic resins non-reactive with the electrolyte.

10. A cell according to claim 9 in which the expansion membrane is formed of a 1 to 4 mil thick polyethylene film and the second membrane is formed of a 0.125 to 2.0 mil thick polytetrafluoroethylene film.

11. A cell according to claim 1 in which the cathode is formed of a multi-apertured sheet having a convex curvature for tensioning said second membrane.

12. A cell according to claim 11 in which the cathode is formed of a weldable core having a thin coating of a polarizable metal selected from the group consisting of gold, silver and platinum.

13. A cell according to claim 11 in which the cathode has a thickness sufficient to prevent the cathode from distorting.

14. An electrochemical cell for the monitoring of a gas comprising:
   insulator walls defining a container having a central passageway;
   a liquid-impermeable expansion membrane supported on said walls across said entire passageway dividing said passageway into a cell chamber and an expansion chamber;
   an anode comprising a porous, high surface area cylindrical body of a non-polarizable metal, having a central bore extending therethrough, said anode being disposed in said cell chamber;
   a cathode comprising a multi-apertured sheet of a polzarizing metal;
   means supporting said sheet across said passageway to enclose said cell chamber;
   a second membrane formed of a liquid impermeable, gas permeable material sealingly attached to said side walls and in intimate tension contact with the outer surface of the cathode, said second membrane being less flexible than said expansion membrane;
   a body of electrolyte chamber between said expansion membrane and in said central bore immersing said anode, and in a quantity sufficient to wet all surfaces of said cathode;
   an electrolyte permeable disc;
   means for supporting said disc over the top surface of the body of said anode;
   an insulator base plate enclosing said expansion chamber, said insulator base plate having gas vent holes therethrough; and
   contact means affording external electrical connection to said anode and cathode.

* * * * *